(12) United States Patent
Demchick

(10) Patent No.: US 7,426,940 B2
(45) Date of Patent: Sep. 23, 2008

(54) RECREATIONAL VEHICLE EQUIPPED WITH EXTERIOR WATER OUTLET

(76) Inventor: Robert L. Demchick, 3700 S. Westport Ave., Sioux Falls, SD (US) 57106-6344

( * ) Notice: Subject to any disclaimer, the term of this patent is extended or adjusted under 35 U.S.C. 154(b) by 942 days.

(21) Appl. No.: 10/628,891

(22) Filed: Jul. 28, 2003

(65) Prior Publication Data

US 2005/0022890 A1  Feb. 3, 2005

(51) Int. Cl.
  *A01G 25/09*  (2006.01)
(52) U.S. Cl. .................................... 137/899
(58) Field of Classification Search .......... 137/563, 137/351, 899
  See application file for complete search history.

(56) References Cited

U.S. PATENT DOCUMENTS

| | | | | |
|---|---|---|---|---|
| 666,051 | A * | 1/1901 | Gron | 222/152 |
| 1,385,836 | A * | 7/1921 | Kerr | 220/562 |
| 2,837,109 | A * | 6/1958 | Eisner | 137/267 |
| 3,280,841 | A * | 10/1966 | Deutsch | 137/606 |
| 3,594,825 | A * | 7/1971 | Reid | 4/663 |
| 3,871,399 | A * | 3/1975 | Watson | 137/899 |
| 4,241,755 | A * | 12/1980 | Snyder | 137/899 |
| 5,351,337 | A * | 9/1994 | Deutsch | 392/450 |
| 5,390,691 | A * | 2/1995 | Sproule | 137/1 |
| 5,507,310 | A * | 4/1996 | Sordello et al. | 137/351 |
| 6,772,793 | B2 * | 8/2004 | Warning | 137/899 |

OTHER PUBLICATIONS

*RV Accessories* (2004) Camco Manufacturing, Greensboro, NC. p. 13. Downloaded as portable document file (PDF) from http://www.camco.net/index_R.htm on Apr. 29, 2004.

*2004 Winnebago Adventurer* (Sales Brochure) Winnebago Industries, Forest City, IA. pp. 6 and 11. (Note: No pagination appears in the brochure. Pages listed are based on the front cover being p. 1.).

*2004 Winnebago Journey* (Sales Brochure) Winnebago Industries, Forest City, IA. pp. 6 and 11. (Note: No pagination appears in the brochure. Pages listed are based on the front cover being p. 1.).

*2004 Winnebago Vectra* (Sales Brochure) Winnebago Industries, Forest City, IA. pp. 6 and 11. (Note: No pagination appears in the brochure. Pages listed are based on the front cover being p. 1.).

* cited by examiner

*Primary Examiner*—Gregory L. Huson
*Assistant Examiner*—Craig M Schneider
(74) *Attorney, Agent, or Firm*—Paul H. Demchick

(57) ABSTRACT

A recreational vehicle equipped with at least one permanently attached exterior water outlet. That outlet may be fitted with a drinking fountain, hose connection or faucet. The purpose of the invention is to provide a convenient water supply on the exterior of the recreational vehicle separate from the city water inlet. That recreational vehicle may be any type of highly portable housing unit designed for use on land. Those types include, but are not limited to, conversion buses, motorhomes, travel trailers, pick-up campers and tent trailers.

11 Claims, 2 Drawing Sheets

RECREATIONAL VEHICLE EQUIPPED WITH EXTERIOR WATER OUTLET

CROSS-REFERENCE TO RELATED APPLICATIONS

Not applicable

STATEMENT REGARDING FEDERALLY SPONSORED RESEARCH OR DEVELOPMENT REFERENCE TO SEQUENCE LISTING, A TABLE, OR A COMPUTER PROGRAM LISTING COMPACT DISK APPENDIX

Not applicable

BACKGROUND OF THE INVENTION

There are many types of highly portable housing units designed for use on land. Those types include, but are not limited to, conversion buses, motorhomes, travel trailers, pick-up campers and tent trailers. The term "recreational vehicle" is taken to embrace all highly portable housing units designed for use on land.

Motorhomes and conversion buses have means of autonomous locomotion. A conversion bus is similar to, and has the chassis of, a passenger bus with modifications to facilitate its use as mobile housing. Motorhomes are structured quite differently from busses. Motorhomes come in several sub-types. These motorhome sub-types are commonly designated as Class A, Class B and Class C motorhomes.

Class A motorhomes are typically between approximately 6 meters and approximately 13 meters in length. Class A motorhomes are commonly referred to as "conventional motorhomes." Class A motorhomes are manufactured on a bare chassis.

Class B motorhomes are typically between approximately 5 meters and approximately 7 meters in length. Class B motorhomes are commonly referred to as "van campers." Class B motorhomes are similar to panel vans with modifications to facilitate their use as mobile housing. Frequently, a raised roof has been added as part of the modifications. The driver in a Class B motorhome is not physically separated from the living area.

Class C motorhomes are typically between approximately 6 meters and approximately 9 meters in length. Class C motorhomes are commonly referred to as "mini-motor-homes." Class C motorhomes are similar to vans with modifications to facilitate their use as mobile housing. In Class C motorhomes, the cab is distinct from the living area. There is typically an over-cab bunk in Class C motorhomes.

Travel trailers lack means of autonomous locomotion. They are typically towed by an automobile or truck. One sub-type of travel trailer is referred to as a "fifth wheel" travel trailer. Fifth wheel travel trailers are designed to be connected to a pickup truck using a special hitch installed in the truck bed. Fifth wheel travel trailers are typically between approximately 7 meters and approximately 13 meters long (exclusive of the vehicle with which the recreational vehicle is towed). The term "tow-behind travel trailer" is commonly used to refer to travel trailers other than fifth wheel travel trailers. A tow-behind travel trailer is typically connected to the automobile or truck using a common trailer hitch. Tow-behind travel trailers are typically between approximately 4 meters and approximately 11 meters long (exclusive of the vehicle with which the recreational vehicle is towed).

Tent trailers lack means of autonomous locomotion. They are typically towed behind an automobile or truck. Tent trailers are typically between approximately 5 meters and approximately 8 meters in length. Tent trailers are commonly referred to as "pop-up trailers" or "folding camping trailers." The sides of tent trailers fold or collapse for towing and for storage.

The term "pick-up camper" is commonly used to refer to a pick-up truck modified to facilitate its use as mobile housing. The term "pick-up camper" is also commonly used to refer to a unit which is intended to be mounted on a pick-up truck to modify the truck for use as mobile housing. Both of those common meanings are embraced here.

Recreational vehicles are used in manners which are distinct from the manners of use of those pre-fabricated housing units commonly referred to as "mobile homes" or "trailers." Despite use of the word "mobile," units of that type are typically used in the same location for extended periods. Frequently, a housing unit of that type has permanent-type utility connections.

Recreational vehicle use is often referred to as "camping," and use of recreational vehicles can facilitate the enjoyment of the outdoors. However, recreational vehicle users have increasingly come to anticipate convenience and many of the amenities associated with fixed-place housing.

Many facilities accommodating recreational vehicles have supply water spigots at campsites ("supply water spigot"). Recreational vehicles frequently have plumbing systems. There is considerable heterogeneity in the specifics of the plumbing system designs for recreational vehicles. This heterogeneity of specific design is found even within a particular type of recreational vehicle (e.g., among Class A motorhomes). Typically, recreational vehicles equipped with plumbing have a storage tank for water. This water storage tank acts as a water supply for use when the recreational vehicle is in use where no water supply spigot is available. Typically, plumbing systems in recreational vehicles have a water inlet for the internal plumbing system. This inlet is commonly referred to as the "city water inlet" without regard to whether the water source is genuinely a municipality. Typically, there are two additional fresh water inlets, one to fill the fresh water storage tank ("fresh water storage tank inlet") and the other to charge the waste water flush out system ("waste water flush out system inlet"). Each of these ports typically has a fitting to allow a hose connection between the supply water spigot and the inlet. Usually, while camping at a location at which a supply water spigot is available, a hose connection is maintained between the supply water spigot and the city water inlet. When required, a temporary hose connection may be made between the supply water spigot and either the fresh water storage tank inlet or the waste water flush out system inlet.

Pipes typically facilitate the water getting to points of water use. Those points of use frequently include commodes, showers, washing machines, automatic dish washers, ice makers, lavatory sinks and kitchen-area sinks. Typically, the plumbing system includes a water heater and separate pipes to carry the heated water to points of use. Recreational vehicle plumbing systems typically include multiple cut-off valves. Frequently plumbing systems in recreational vehicles have drains at low points to allow draining of the system. This draining is useful for, among other things, winterizing the recreational vehicle. It is not infrequent that recreational vehicle plumbing systems include one or more filters or other water purification means.

Typically, the city water inlet, fresh water storage tank inlet, waste water flush out system inlet, and the sewage outlet are on the left (port) side of the recreational vehicle. Typically, the city water inlet is approximately 1.3 meters above the ground at a point approximately equidistant from the front and the rear of the recreational vehicle. The sewage outlet is typically below the body of the recreational vehicle near the left side wheels of the recreational vehicle. The sewage outlet is typically slightly closer to the front of the recreational vehicle than the wheels are. In the cases of recreational vehicles with a single doorway, it is typical that that doorway is on the right (starboard) side of the recreational vehicle.

Recreational vehicles frequently have electrical systems. For a recreational vehicle with an electrical system, the connection with an external source of electricity is typically on the left side of the recreational vehicle near the rear of the recreational vehicle. The significant distance between the water inlets and the electrical connections improves safety.

Many recreational vehicle users spend a large amount of time outdoors, in proximity to the recreational vehicle. Many recreational vehicles have features which are conveniences for the users of the recreational vehicle when those users are outside and near the recreational vehicle. Examples include awnings, exterior cooking burners, and exterior showers. Much of this time outdoors in proximity to the recreational vehicle is spent on the right side of the vehicle. In the cases of recreational vehicles with a single doorway, the preference for spending time on the right side of the recreational vehicle is, in part, because of the proximity to the door of the recreational vehicle. The preference for spending time on the right side of the recreational vehicle is, in part, to avoid proximity to the utility connections. Avoiding proximity to the utility connections is preferred, because the utility connections are usually visually unattractive, and because it is not infrequent for there to be some degree of disagreeable odor due to the sewage outlet. Furthermore, during any activities on the side of the recreational vehicle with the utility connections, the utility connections act as obstacles and potential hazards which need to be avoided.

Campsites which were designed for use with recreational vehicles are typically configured in anticipation that activities such as cooking and eating will be done on the right side of the recreational vehicle. Such campsites typically are configured in anticipation of the utility connections being on the left side of the recreational vehicle. By way of examples, picnic tables, benches, fire rings and charcoal grills supplied on campsites are usually located in the campsite so that they will be on the opposite side of the recreational vehicle from the utility connections. That campsite arrangement is one more factor that encourages outdoor activities near the recreational vehicle to be done on the side away from the utility connections.

The utility "hook-ups" (including electric supply and supply water spigot) on a campsite are typically near the edge of the campsite. Often, the area beyond the campsite is not readily suitable for many things done outdoors such as sitting, eating and cooking. For example, the area beyond the edge of the campsite often has bushes or rough terrain. The positioning of hook-ups near the edge of the campsite is one more factor that encourages outdoor activities near the recreational vehicle to be done on the side away from the utility connections.

Many recreational vehicle users use water outside the recreational vehicle in the vicinity of the recreational vehicle. Those uses include drinking, food and drink preparation, and washing of items. Some recreational vehicle users enter the recreational vehicle to use water. Some recreational vehicle users carry water in containers from the recreational vehicle. Some recreational vehicle users include a "Y" adaptor with the hose connection between the supply water spigot and the city water inlet (either between the hose and the supply water spigot or between the hoses and the city water inlet). This "Y" affords the user an external water supply at the location of the utility connections. Sometimes, a hose is connected to the "Y" adaptor between the supply water spigot and the city water inlet. In those cases, a valve of some type is frequently connected to the end of the hose which is not connected to the "Y". The end of the hose with the valve can be place on the right side of the recreational vehicle to serve as a make-shift source of water in a convenient location. These make-shift sources of water have several drawbacks. These make-shift sources of water cannot act as a source of water when the recreational vehicle is not connected to a supply water spigot. These make-shift sources of water are not entirely convenient in that they require some degree of set-up. Depending on the exact location of the hose being used in such a make-shift water source, the hose can act as a hazard. Depending on where the end of the hose which is not connected to the "Y" is located and how it is stored, the situation can be unsanitary.

Camco Manufacturing, Inc., Greensboro, N.C., supplies a "90° Water Faucet" (Camco Manufacturing product number 22463). The product is essentially a plumbing "T" with certain fittings. A threaded fitting on the product allows attachment to the city water inlet. Another threaded fitting on the product allows attachment to a hose. That hose can be connected to a supply water spigot. The product also has its own spigot with a valve. The use of the "90° Water Faucet" allows water access near the city water inlet while the recreational vehicle is connected to a supply water spigot. However, this cannot act as a source of water when the recreational vehicle is not connected to a supply water spigot.

There are also recreational vehicles which have water outlets permanently installed on the exterior of the recreational vehicle near the sewage outlet. This is, in large part, to allow for clean-up after messy jobs including those involving sewage. However, the location of such water supplies makes it unlikely that such water would be reliably sanitary for uses such as drinking and food preparation. The location of such water supplies is inconvenient given that most of the time that recreational vehicle users spend outdoor in proximity to the recreational vehicle is spent on the right side of the recreational vehicle. Also use of such water supplies involves the hazards, inconveniences, and lack of attractiveness that comes with being near the sewage outlet.

BRIEF SUMMARY OF THE INVENTION

The purpose of the present invention is to supply one or more permanently installed, conveniently located, outlets for water on the exterior of a recreational vehicle. Each such water outlet can be equipped with a drinking fountain, a faucet, a threaded fitting to accommodate a hose connection, or any other fitting which would be convenient for the user. Each such outlet can be located at any convenient location, remote from the city water inlet. In many cases, some location on the right side of the recreational vehicle will be appropriate.

BRIEF DESCRIPTION OF THE SEVERAL VIEWS OF THE DRAWING

FIG. 2a depicts the right side of the fifth wheel recreational vehicle and FIG. 2b depicts the left side of the fifth wheel recreational vehicle.

DETAILED DESCRIPTION OF THE INVENTION

The purpose of the invention described below is to provide one or more convenient water supplies on the exterior of the recreational vehicle remote from the city water inlet.

The following is a description of the preferred embodiment of the invention. The described embodiment is based on adaptation of a fifth-wheel travel trailer. More specifically, it is based on adaptation of an Experience Sunrise recreational vehicle manufactured by Teton Motorhomes, Inc. That recreational vehicle has a nominal length of 33' and a nominal width of 102".

The exterior water outlet of this preferred embodiment is connected in a manner which is logically similar to the manner of connection of any conventional cold water point of use (e.g., a commode) which would be included in the recreational vehicle's plumbing system. More particularly, a "tee" is included along the cold water piping leading to the typical points of water use. From said "tee" a pipe is routed through the "basement" storage area to the exterior Water outlet. The exterior water outlet is mounted in the exterior wall of the recreational vehicle. The manner of mounting for the exterior water outlet is essentially the same as the manner of mounting of the water inlets. A cut off valve for the exterior water outlet is located inside the "basement" storage area. The exterior water outlet is fitted with a male hose fitting which is self closing (i.e., that prevents water flow if nothing is connected to the hose fitting). That facilitates use of the exterior water outlet with various fittings which can be conveniently connected for use and can be conveniently disconnected for travel.

The location of the exterior water outlet of the preferred embodiment of this invention is on the right side of the recreational vehicle. More particularly, the location of the exterior water outlet of the preferred embodiment of this invention is approximately 0.2 meters above the bottom skirting of the recreational vehicle and approximately 0.2 meters toward the rear of the recreational vehicle from the edge of the "basement" storage access panel which is nearest the rear of the recreational vehicle.

A hose can be easily attached to such an exterior water outlet. Alternatively, a valve-controlled spigot can be connected to the exterior water outlet using the female threading of the valve-controlled spigot. Such valve controlled spigots with appropriate fittings for quick connection to the exterior water outlet described here are widely available commercially.

An exterior water outlet plumbed as described here as a component of the preferred embodiment would be able to supply water from the water storage tank when the recreational vehicle is not connected to a supply water spigot.

Figure 1:
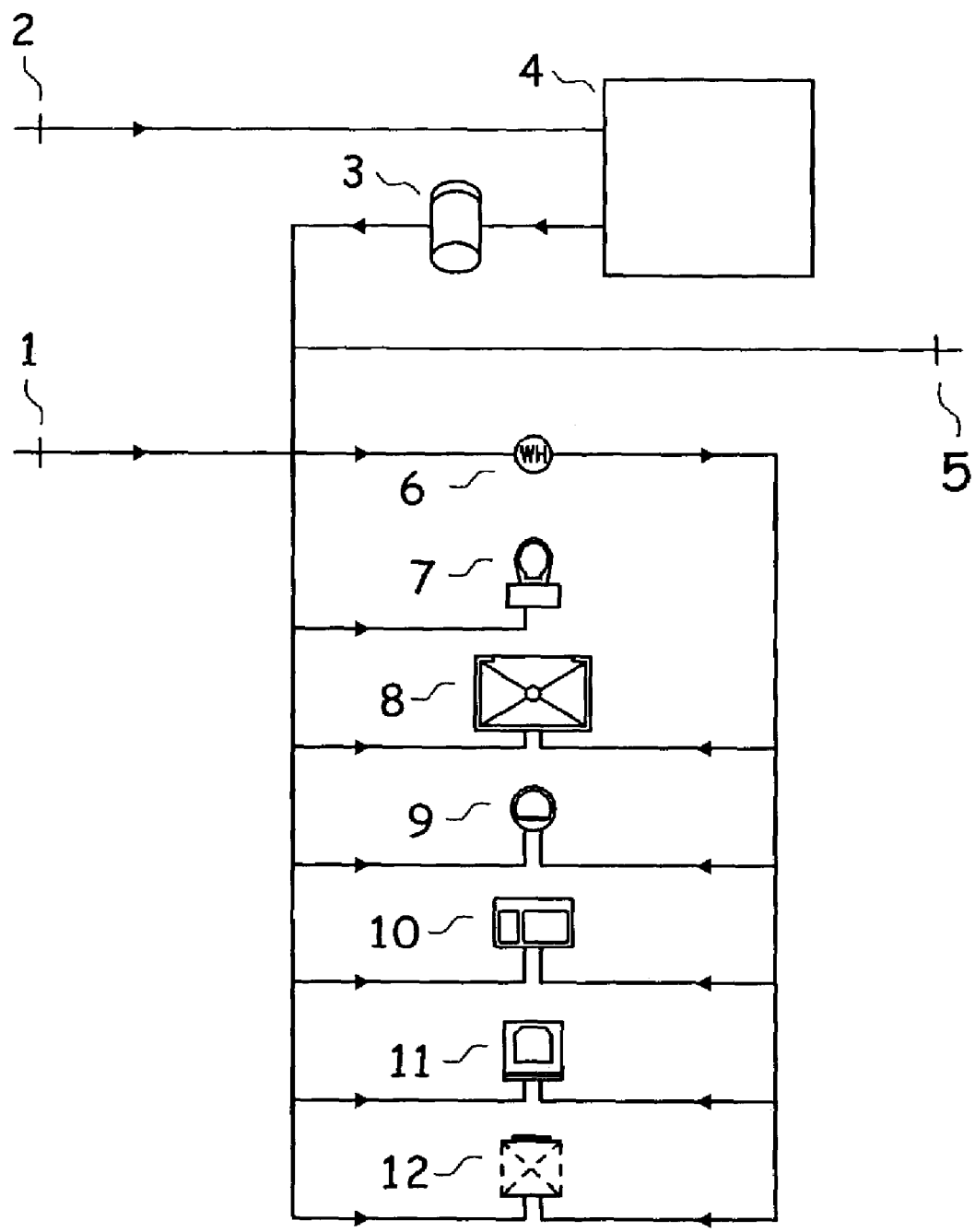
FIG. 1 is a simplified schematic representing the logic of a typical fresh water plumbing system of a recreational vehicle equipped as the invention described in this disclosure.

FIG. 1 is a simplified schematic representing the logic of a typical fresh water plumbing system of a recreational vehicle equipped as the invention described in this disclosure. The simplifications include omission of valves (including cut-off valves), low-point drains and water purification means. The arrows indicate the typical direction of flow in the pipes at those times at which water is flowing at that point. 1 represents the city water inlet. 2 represents the fresh water storage tank inlet. 3 represents a pump which is used to pressurize the water when the fresh water plumbing of the recreational vehicle is being used while not connected to city water. Typically, such a pump is electrically powered. Typically, there is a pressure sensing system which automatically turns the pump on when the pressure in the water lines is low. 4 represents a fresh water storage tank. 5 represents the exterior water outlet. 6 represents the water heater. 7-12 represent typical points of use of the interior of a recreational vehicle. More specifically, 7 represents a commode, 8 represents a shower, 9 represents a lavatory, 10 represents a kitchen sink, 11 represents a clothes washing machine and 12 represents an automatic dish washer. Not all recreational vehicles which are equipped with plumbing systems have all of the points of use represented. Some recreational vehicles have additional types of points of use. Some recreational vehicles have more than one of certain types of points of use. In the prior art, the exterior outlet represented by 5 and the plumbing branch immediately leading to that outlet do not exist.

Figure 2:
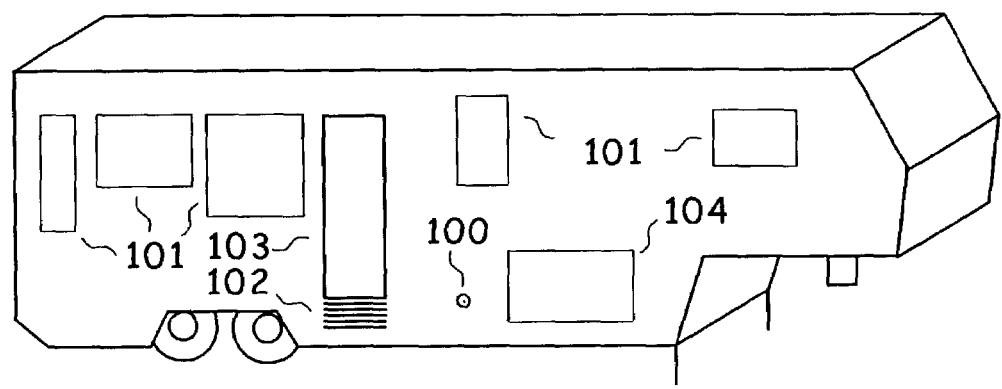
FIG. 2 depicts a typical fifth wheel recreational vehicle showing the approximate location of the exterior water outlet of the preferred embodiment of the invention described in this disclosure. More particularly.
Figure 2:
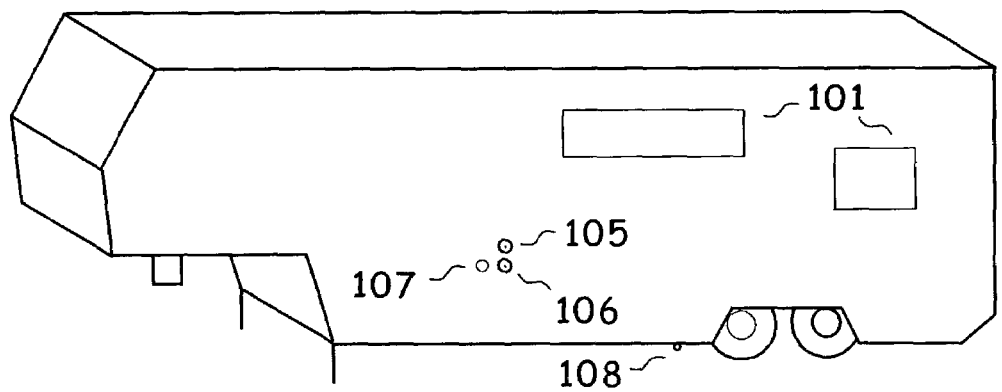

Referring to FIG. 2, 100 represents the approximate location of the exterior water outlet in the preferred embodiment of the invention. 104 represents a hatch that permits access to the "basement" of the recreational vehicle. 103 represents the door. 102 represents the stairs (shown stowed for travel). Each occurrence of 101 represents a window. 105 represents the city water inlet. 106 represents the fresh water storage tank inlet. 107 represents the waste water flush out system inlet. 108 represents the sewage outlet.

It should be noted that FIG. 2 is a simplified view of the recreational vehicle which is the preferred embodiment.

The specific location of the exterior water outlets could be varied to facilitated convenient use.

The invention could be readily applied to other recreational vehicles by appropriate adaptation of the specific plumbing and the location of that plumbing. The inventions could be practiced for all recreational vehicles including, but not limited to, conversion buses, motorhomes, travel trailers, pick-up campers and tent trailers.

The invention could also be practiced with different end-use fitting's than that described as the preferred embodiment. For example, the fitting could be a faucet instead of a hose fitting. As another example, the water outlet could be equipped as a drinking fountain.

It would be possible to include more than one exterior water outlet on a given recreational vehicle. Those multiple outlets might have different fitting types or might have the same fitting types as each other.

It would be possible for the plumbing leading to an exterior water outlet to have water purification means.

It would be possible to create the present invention during initial manufacture of a recreational vehicle or by post manufacture modification of a recreational vehicle.

The invention claimed is:

1. A recreational vehicle equipped with a plumbing system comprising, in communication with each other,
   a city water inlet for potable water on the port side of said recreational vehicle,
   a storage tank for potable water, and
   an outlet for potable water which is attached on the exterior of said recreational
   vehicle on the starboard side of said recreational vehicle.

2. A recreational vehicle as in claim 1 in which said recreational vehicle is a motorhome.

3. A recreational vehicle as in claim 1 in which said recreational vehicle is a fifth-wheel type travel trailer.

4. A recreational vehicle as in claim 1 in which said recreational vehicle is a travel trailer other than a fifth-wheel type travel trailer.

5. A recreational vehicle as in claim 1 in which said recreational vehicle is a conversion bus.

6. A recreational vehicle as in claim 1 in which said recreational vehicle is a pick-up camper.

7. A recreational vehicle as in claim 1 in which said recreational vehicle is a tent trailer.

8. A recreational vehicle as in claim 1 in which said outlet for potable water is equipped with a drinking fountain.

9. A recreational vehicle as in claim 1 in which said outlet for potable water is equipped with a hose connection.

10. A recreational vehicle as in claim 1 in which said outlet for potable water is equipped with a faucet.

11. A recreational vehicle as in claim 1 further comprising a water pump in communication with said city water inlet for potable water, said storage tank and said outlet for potable water.

* * * * *